United States Patent
Staton et al.

(10) Patent No.: US 10,022,008 B1
(45) Date of Patent: Jul. 17, 2018

(54) COOKING ASSISTIVE DEVICE AND METHOD FOR MAKING AND USING SAME

(71) Applicant: NEWTONOID TECHNOLOGIES, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 0 days.

(21) Appl. No.: 15/494,476

(22) Filed: Apr. 22, 2017

(51) Int. Cl.
*A47J 27/00* (2006.01)
*A47J 43/28* (2006.01)
*A47J 36/00* (2006.01)
*A47J 27/62* (2006.01)
*A47J 44/00* (2006.01)

(52) U.S. Cl.
CPC .......... *A47J 27/002* (2013.01); *A47J 27/004* (2013.01); *A47J 27/62* (2013.01); *A47J 36/00* (2013.01); *A47J 43/287* (2013.01); *A47J 44/00* (2013.01)

(58) Field of Classification Search
CPC .......... A47J 45/068; A47J 36/00; A47J 27/00; A47J 27/62; A47J 44/00

USPC ..... 99/325, 326, 327, 328, 329 R, 332, 333, 99/334
See application file for complete search history.

(56) References Cited

U.S. PATENT DOCUMENTS

| 8,101,892 B2 * | 1/2012 | Kates ..................... B65D 79/02 219/494 |
| 9,439,530 B2 * | 9/2016 | Logan ..................... A47J 27/62 |
| 2015/0064314 A1 * | 3/2015 | Manuel ................... A47J 36/32 426/231 |

* cited by examiner

Primary Examiner — Reginald L Alexander
(74) Attorney, Agent, or Firm — Lathrop Gage L.L.P.

(57) ABSTRACT

A cooking assistive device comprises a portable housing configured to be disposed on or proximate a food item. The device includes a plurality of sensors situated within the housing, a dispenser, and a utensil holder. The device has a memory storing computer-readable instructions, and a processor. The processor is configured to execute the instructions to: (a) obtain a wireless input from a mobile device; (b) access data stored in a remote database; (c) obtain a reading from at least one of the plurality of sensors; and (d) cause the dispenser to dispense a substance in response to the reading.

20 Claims, 7 Drawing Sheets

COOKING ASSISTIVE DEVICE AND METHOD FOR MAKING AND USING SAME

FIELD OF THE DISCLOSURE

The disclosure relates generally to the field of cooking assistive devices. More specifically, the disclosure relates to a cooking assistive device that monitors cooking operations and provides a controlled output in response to the monitoring.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, a cooking assistive device comprises a portable housing configured to be disposed on a food item. The device has a plurality of sensors that are situated within the housing, a network interface, and a memory storing computer-readable instructions. The device includes a processor configured to execute the instructions to: (a) access data stored in a remote database; (b) obtain a reading from at least one of the plurality of sensors; and (c) communicate a message to a mobile device of a user in response to the reading.

According to another embodiment, a cooking assistive device comprises a portable housing configured to be disposed on or proximate a food item. The device includes a plurality of sensors situated within the housing, a dispenser, and a utensil holder. The device has a memory storing computer-readable instructions, and a processor. The processor is configured to execute the instructions to: (a) obtain a wireless input from a mobile device; (b) access data stored in a remote database; (c) obtain a reading from at least one of the plurality of sensors; and (d) cause the dispenser to dispense a substance in response to the reading.

According to yet another embodiment, a cooking assistive device comprises a portable housing configured to be disposed on or proximate a food item. The housing has a plurality of openings and at least one wheel. The device includes a plurality of sensors situated within the housing, and a memory storing computer-readable instructions. The device has a processor configured to execute the instructions to: (a) access data stored in a remote database; (b) obtain a reading from at least one of the plurality of sensors; (c) compare the reading to the data; and (d) communicate with a cooking device in response to the comparison.

BRIEF DESCRIPTION OF THE SEVERAL VIEWS OF THE DRAWINGS

Illustrative embodiments of the present invention are described in detail below with reference to the attached drawing figures and wherein.

DETAILED DESCRIPTION

Preparing a home cooked meal can be a laborious and time consuming process. With the busy lifestyles of today, consumers are eating out at restaurants and foregoing cooking altogether more than ever before. According to the U.S. Department of Commerce, the sales at eateries surpassed the sales at grocery stores for the first time in 2015 since the Department began collecting this data in 1992. This is in part because people are often unwilling to devote the time and expend the effort it takes to prepare a savory meal at home, particularly considering that the meal may not turn out as the preparer intended. The present disclosure relates, in general, to a cooking assistive device that may allow a user to more conveniently prepare personalized meals.

Figure 1:
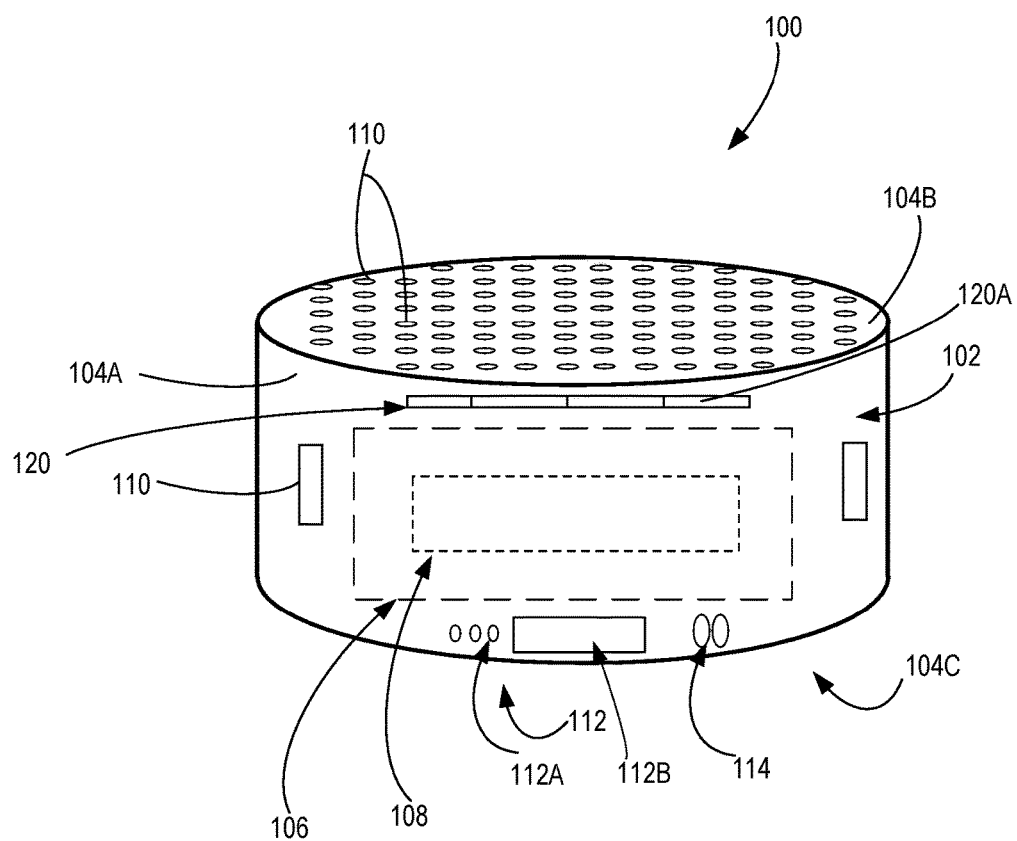
FIG. 1 is a perspective view of a cooking assistive device, according to an embodiment.

FIG. 1 shows a cooking assistive device 100, according to an example embodiment. The cooking assistive device 100 may have a housing 102. The housing 102, in an embodiment, may be generally cylindrical and resemble a hockey puck. The housing 102 may include a side wall 104A, a top wall 104B, and a bottom wall 104C that opposes the top wall 104B. As discussed herein, the cooking assistive device 100 may include sensors and other electronics that allow the device 100 to monitor cooking operations and provide a controlled response. In a currently preferred embodiment, the device 100 is portable.

The cooking assistive device 100 may be configured to be disposed in a cooking environment (e.g., inside a pot or pan on a burning stove, inside a gas or other grill, in a heated oven or microwave, etc.). The housing 102 may be made of any suitable material that can withstand cooking temperatures (e.g., temperatures of up to 500 degrees Fahrenheit or more). In embodiments, the device 100 may be configured to dissipate heat (e.g., in embodiments, the device 100 may be placed together with a food item inside a pan on a burning stove and generally maintain its temperature as the food item gets hotter over time); such may ensure that the device 100 monitors the cooking operation and assists therewith without itself becoming a source of heat for the food item being cooked. In other embodiments, and as discussed herein, the device 100 may be used as a source of heat for (e.g., the device 100 may be used to temporarily heat up or maintain the temperature of) a food item.

The device 100 may come into contact with food items (e.g., raw meat being cooked, a pizza being heated, a stew being prepared, etc.). Care may therefore be taken to ensure that the material(s) comprising the housing 102, or at least the materials comprising the outer surfaces thereof, are non-toxic and do not adversely affect the food in contact with the device 100.

In embodiments, the housing 102 may comprise heat resistant plastic. For example, the housing 102 may be made at least in part of Vespel®, Torlon®, Ryton®, Noryl®, PEEK, other polymers, or a combination thereof. Additionally or alternately, the housing 102 may comprise ceramics. For example, the housing 102 may be made in whole or in part using transparent ceramics (also known as "transparent aluminum"), such as aluminum oxynitride ("AION") or other transparent ceramics, known in the art. In other embodiments, the housing 102 may comprise aircraft aluminum (e.g., 6061-T6 Aluminum), 316 stainless steel, or other similar material(s). In some embodiments, and particularly where the housing 102 comprises materials that could potentially harm the food in contact with the device 100, the housing 102 outer surfaces may include a polymer or other coating that is biocompatible (i.e., is compatible with the various foods with which the housing 102 may come into contact with). While examples of particular materials comprising the housing 102 are provided herein, the artisan will appreciate that the housing 102 may comprise any suitable material now known or subsequently developed.

The housing 102 may include a compartment 106. The compartment 106, in embodiments, may be formed within the cylindrical housing 102 (e.g., a portion in the core of the cylinder forming the housing 102 may be removed to create the compartment 106). In other embodiments, the compartment 106 may comprise a separate housing made using thermal resistive materials disposed within the device housing 102. The compartment 106 may enclose or otherwise retain electronics 108, which are discussed in more detail below, and may shield the electronics 108 from excessive heat to which the device housing 102 may be exposed.

The device 100 may include one or more openings 110. The openings 110 may be provided in the housing 102 (e.g., the housing side wall 104A, the top wall 104B, the bottom wall 104C), in the compartment 106, etc. The number of openings 110 provided in one area (e.g., the top wall 104B) may be different from the number of openings 110 provided in another area (e.g., the side wall 104A). Further, the size of all openings 110 need not be the same. The openings 110 may allow for electronics 108 (e.g., sensors) in the compartment 106 to sense at least one characteristic of a food item being prepared. In some embodiments, one or more of the openings 110 may be microscopic.

The housing 102 may include an input device 112. The input device 112 may be provided at one or more of the outer surfaces of the device walls (e.g., on the outer surface of side wall 104A or another wall). The input device 112 may include buttons 112A, and/or knobs, switches, keys, or any other device that may allow a user to provide an input to the device 100 (and specifically, to the electronics 108 in the device 100). In some embodiments, the input device 112 may comprise a media port 112B (such as a USB port or a SD or microSD port) to allow for media (e.g., a USB drive, a SD or micro SD drive, a laptop memory, a smart phone memory, etc.) to be communicatively coupled to the device 100.

In some embodiments, the device 100 may be a voice command device (i.e., a VCD). For example, the input device 112 in embodiments may include audible sensors and electronics collectively configured to perceive voice commands and take action in response thereto. A user may, for instance, utter the words "turn on" and "turn off" to cause the device 100 to power on and off, respectively. Similarly, a user may use voice commands (or other audible commands, e.g., clapping of the hands, snapping of the fingers, etc.) to cause the device 100 to rotate about its axis, move from one location to another, or take other action.

Alternately or additionally, the device 100 may be a gesture controlled device. The skilled artisan understands that gesture controlled devices, known in the art, recognize and interpret movements of the human body in order to interact with and control a computing system without physical contact. While gesture control may be incorporated in the device 100 by any means now known or subsequently developed, in an embodiment, the input device 112 may include infrared gesture sensors and electronics that collectively allow movement of a user proximate the device 100 to be perceived and acted upon. In these embodiments, the user may, for example, wink at the device 100 to cause it to power on, wave at the device 100 to cause it to power off, etc.

In embodiments, the housing 102 may also include an output device 114. The output device 114 may include visual indicators (e.g., differently colored lights, lights that can blink at different rates, an LCD, LED or other screen to provide information), audible indicators (e.g., speakers for generating an alarm), or any other output device now known or subsequently developed. In some embodiments, at least a part of the input device 112 and the output device 114 may be combined (e.g., as a touch screen). A user may functionally interact with the cooking assistive device 100 using the input device 112 and the output device 114. Alternately or additionally, and as discussed below, the user may use a smart phone or other computing machine communicatively coupled to the device 100 to interact therewith (e.g., to control the operation of the device 100, to send instructions to and/or receive instructions from the device 100, etc.). The input and output devices 112, 114, where provided on the device 100 (e.g., on the housing 102), may be configured to operate in cooking environments (e.g., the input and output devices 112, 114 (and one or more other device components) may be waterproof, withstand cooking temperatures, etc.).

Figure 2:
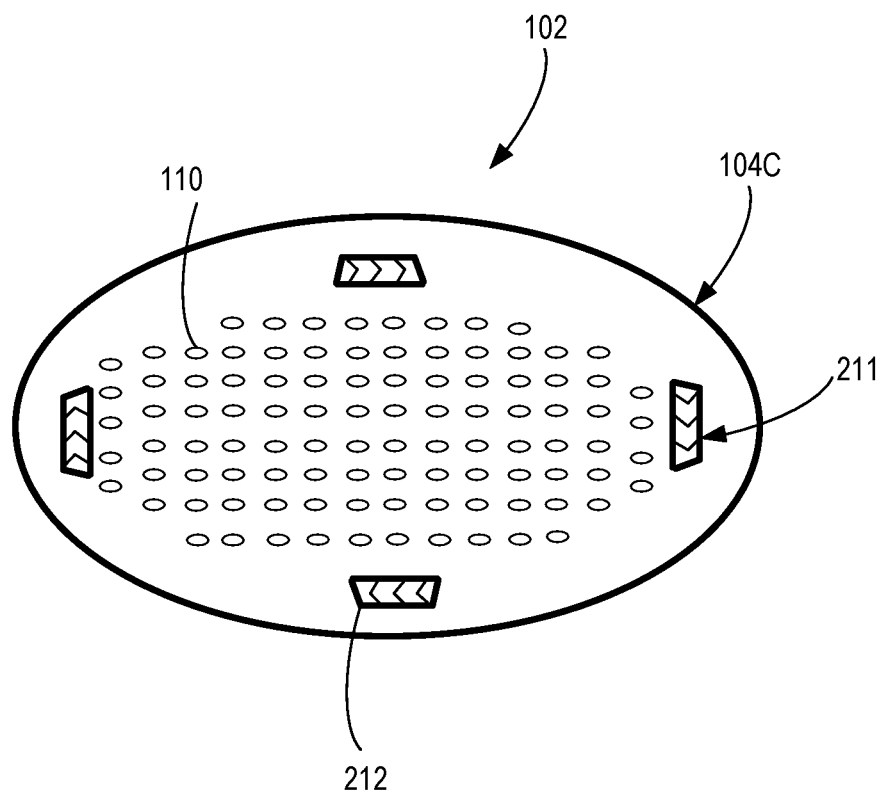
FIG. 2 is a bottom view of the cooking assistive device of FIG. 1.

FIG. 2 shows a bottom view of the housing 102. The bottom wall 104C, like the side and top walls 104A, 104B, respectively, may include openings 110 to allow for the electronics 108 (e.g., sensors) to be in sensing communication with the food item(s) being prepared. In embodiments, the housing 102 may further include a propelling mechanism 211. For example, as shown in FIG. 2, one or more wheels 212 may extend through the bottom wall 104C. Operation of the wheels 212 may be controlled by the electronics 108, and the wheels 212 may enable the device 100 to autonomously move from one location to another (akin to, for example, a Roomba® robot vacuum). Alternately or additionally, the propelling mechanism 211 may comprise movable belts or other means (e.g., electromagnets) to enable the device 100 to travel from one location to another. In some embodiments, the propelling mechanism 211 may be omitted.

Figure 3:
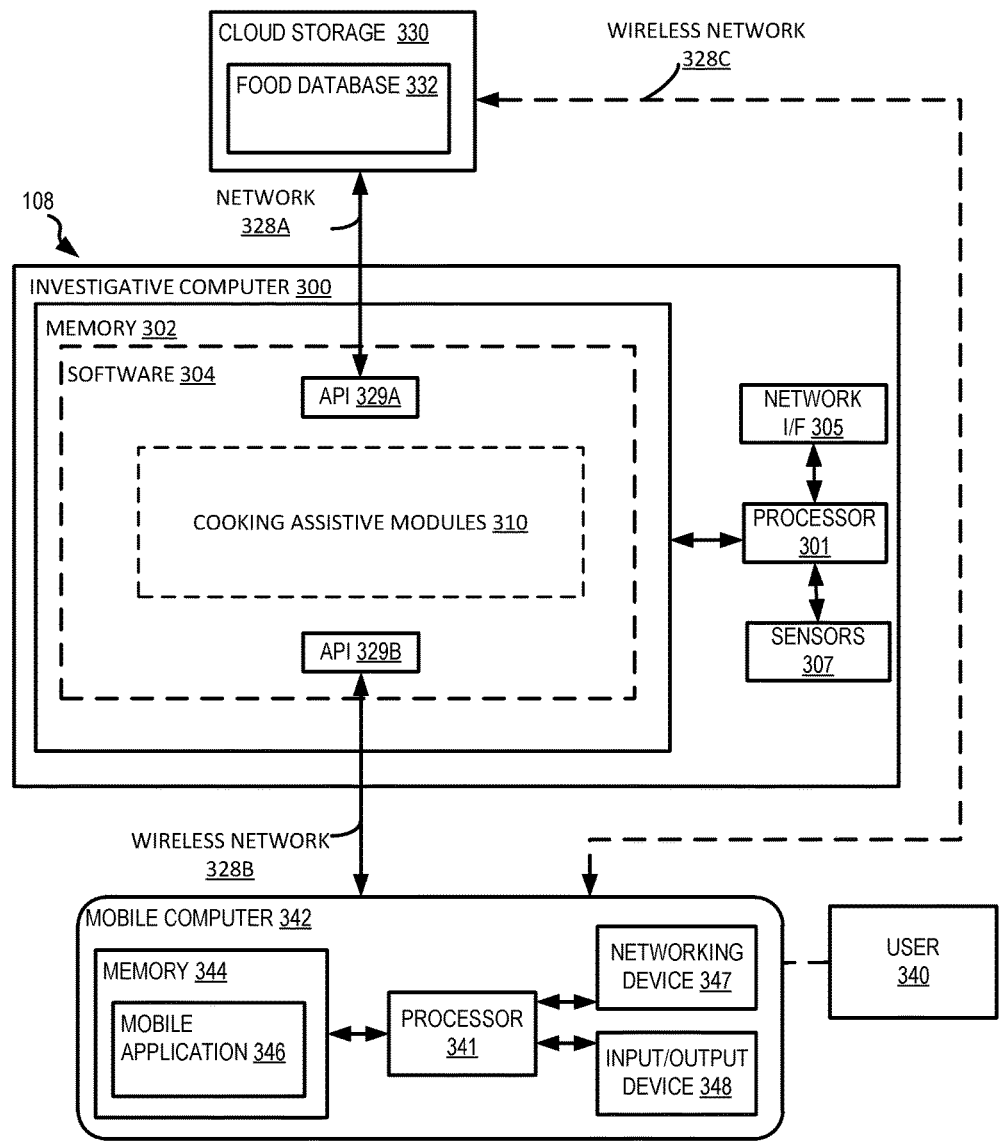
FIG. 3 is a schematic illustration of an investigative computer of the cooking assistive device of FIG. 1.

FIG. 3 shows the electronics 108 in additional detail. The electronics 108, in an embodiment, may comprise an investigative computer 300. The example investigative computer 300 includes a processor 301 communicatively coupled to a memory 302, a network interface 305, and sensors 307. Processor 301 represents one or more digital processors. In some example embodiments, the processor 301 may be configured through particularly configured hardware, such as an application specific integrated circuit (ASIC), field-programmable gate array (FPGA), etc., and/or through execution of software (e.g., software 304) to perform functions in accordance with the disclosure herein. Memory 302 represents one or more of volatile memory (e.g., RAM) and non-volatile memory (e.g., ROM, FLASH, magnetic media, optical media, etc.). Although shown within the investigative computer 300, memory 302 may be, at least in part, implemented as network storage that is external to device housing 100 and accessed via network interface 305. Network interface 305 may be implemented as one or both of a wired network interface and a wireless network (e.g., Wi-Fi, Internet, Bluetooth, etc.) interface, as is known in the art.

The sensors 307 comprise one or more sensors which may be configured to sense at least one characteristic of a food item to be (or being) prepared. Examples of particular sensors 307 that may be employed with the device 100 are provided below.

Software 304 may be stored in a transitory or non-transitory portion of the memory 302. Software 304 includes machine readable instructions that are executed by processor 301 to perform one or more of the functions of the device 100. The software 304 may, in embodiments, comprise cooking assistive modules 310 (including, e.g., programming instructions), as discussed in more detail herein, and Application Programming Interfaces 329A and 329B.

The Application Programming Interface 329A and the network interface 305 may collectively allow the investigative computer 300 to communicate over a network 328A with a food database 332 housed on the cloud (e.g., on cloud storage 330 as shown) or on another server. The network 328A may be a wireless network, such as a Wi-Fi, Bluetooth, or other wireless (or wired) network. The food database 332 may store cooking data 332A may include many different types of information pertinent to the operation of the device 100 (e.g., information about food items, such as their chemical makeup, appearance, and cooking characteristics, information about cooking devices, information about recipes to prepare various food items in line with the preferences of a particular user, etc.), as discussed herein. The cooking assistive modules 310 may obtain readings from the sensors 307, and/or may obtain information from the food database 332 or other computing devices, to assist a user in preparing a personalized meal.

The Application Programming Interface 329B and the network interface 305 may collectively allow the investigative computer 300 to communicate over a network 328B with a mobile computer 342 of a user 340. The mobile computer 342 may be, for example, a smart phone, a laptop, a PDA, or any other portable computer whether now known or subsequently developed associated with the user 340. The user 340 may be, e.g., a chef, cook, a cooking hobbyist, a restaurant patron, or any other person or group of people.

The mobile computer 342 may include a processor 341, which may be in data communication with a memory 344, a networking device 347, and an input/output device 348. The processor 341 may be one or more digital processors. The networking device 347 may be configured to allow the mobile computer 342 to communicate with the device 100, and specifically the investigative computer 300 thereof, and with other computerized devices over wireless or wired networks.

In some embodiments, to interact with the device 100 via the mobile computer 342, the user 340 may download in the mobile computer memory 344 a mobile application 346. The mobile application 346 may include machine readable instructions that are executed by the mobile computer processor 341 to perform the functionality of the mobile computer 342 as described herein. The mobile application 346 may include an interface (e.g., a graphical user interface implemented on a touch screen) to allow the user 340 to control the operation of and otherwise communicate with the device 100.

In an embodiment, the food database 332 may contain recipes to cook food items (e.g., a recipe to cook a burger, a recipe to cook a pizza, a recipe to make brownies, etc.). The recipes may include, for example, publically available recipes to cook the various food items. The artisan understands that different food preparers (e.g., chefs, cooks, etc.) may employ different recipes to prepare the same type of food item. For example, a chef at a restaurant may prepare a Chicago style pizza one way and a chef at another restaurant may prepare a Chicago style pizza a different way. Or, for instance, one cookbook may indicate that to cook a rare burger, the burger should be cooked at one temperature and flipped over after a particular time period, whereas another cookbook may indicate that the rare burger should be cooked at a different temperature and should be flipped over after a different time period. The food database 332 may, in embodiments, contain multiple recipes to cook food items, including multiple recipes to cook the same type of food item (e.g., multiple recipes to prepare a rare burger, multiple recipes to prepare a well done burger, multiple recipes to prepare Chicago style pizza, a porterhouse or other steak, etc.). The user may be allowed to use the input device 112, and in embodiments, the mobile device 342, to choose the recipe he or she prefers. In embodiments, the user 340 may further be allowed to input into the database 332 recipes preferred by the user 340. For example, the user 340 may use the device media port 112B to communicate a recipe to the device memory 302, which recipe may be uploaded to the food database 332. In some embodiments, the user 340 may use the mobile device 342 to communicate with the food database 332 directly over a wireless (or wired) network 328C.

In some embodiments, data in the food database 332 may be dynamic. For example, the food database 332 may have associated therewith a server or other device that periodically scours the internet for new recipes posted on various websites, so that these recipes may be added to the food database 332.

Data in the food database 332 may be encrypted, password protected, or otherwise secured. In some embodiments, the food database 332 may include separate profiles for the various users of the various devices 100 (e.g., a profile for the user 340 that is accessible via a unique user name and password created by the user 340), and a user may be allowed to only access data on the database 332 that belongs to or is otherwise associated with that user's profile.

The user 340 may use the input device 112 and/or the mobile computer 342 to choose a recipe that aligns with his or her preferences. For example, the user 340 may choose a particular recipe housed in the database 332 for cooking a food item when the user 340 is about to prepare that food item. Or, for example, the user may choose all recipes from a particular cookbook or chef when setting up the device 100. In some embodiments, the users of the various devices 100 may be allowed to rate the recipes housed on the database 332, and the user 340 may be allowed to choose the highest rated recipes for his device 100 (or choose all recipes chosen by a different user). As discussed herein, the cooking assistive device may tailor its operation to the information in the database 332, including the recipes stored therein.

The food database 332 may include information that allows the device 100 to reduce the risk of foodborne illness. Foodborne illnesses can be quite serious. The Centers for Disease Control and Prevention estimates that each year approximately 48 million people in the United States get sick from a foodborne illness, 128,000 are hospitalized, and 3,000 die. The database 332 may, in embodiments, contain information to allow the cooking assistive modules 310 to determine food spoilage. For example, the database 332 may include information about the smell of various food items. The artisan understands that food items may have associated therewith a unique odor. This unique odor may (but need not) be discernible by the human nose; for instance, fresh baked bread and French fires may each be identified by their respective unique aromas. The artisan also understands that when a food item goes bad, the odor emitted by it changes (e.g., Chinese takeout may smell delectable when it is ordered but may smell pungent after it has gone bad). This is because the substances (e.g., gases) emitted by a food item upon spoilage differ from the substances emitted by the food item prior to spoilage. Like the Haier concept fridge, for example, which contains a large catalogue of smells associated with various food items and uses same to determine the freshness of a food item, the database 332 may contain a databank of the smells of different foods to enable the device 100 to determine food spoilage, as discussed herein.

Spoilage may also alter the appearance of a food item. For example, a yellow banana may turn brown as it begins to rot because of the reaction of polyphenol oxidase in the banana with oxygen, red meat may develop black or green spots because of significant bacteria growth, et cetera. In some embodiments, the database 332 may contain images of good food items and bad food items (e.g., images of ripe bananas and images of rotten bananas, images of fresh red meat and spoiled red meat, etc.), so as to allow the device 100 to identify food spoilage using the sensors 307 as discussed herein.

In some embodiments, the database 332 may contain pertinent information about particular cooking devices, such as convection ovens, microwaves, toasters, etc. The artisan understands that two cooking devices may cook (or heat up) a food item differently, even if the same settings (e.g., power settings, time settings, temperature settings, etc.) are chosen on each. For instance, one microwave may suitably warm a pizza slice that is placed therein for one minute at the highest power setting, whereas another microwave set on the highest power setting may burn the pizza slice in that time. The database 232 may include information that allows the device 100 to account for such variations in the cooking devices. For instance, the database 232 may include information outlining that a high stove setting of a stove manufactured by one manufacturer equates to a medium stove setting of a stove manufactured by another manufacturer, and other such information that allows the device 100 to tailor its operation, if and as needed, to the particular cooking device being used by the user 340. The user 340 may identify the cooking devices he or she typically employs (e.g., the cooking devices in his home) during the setup process for the device 100.

Figure 4:
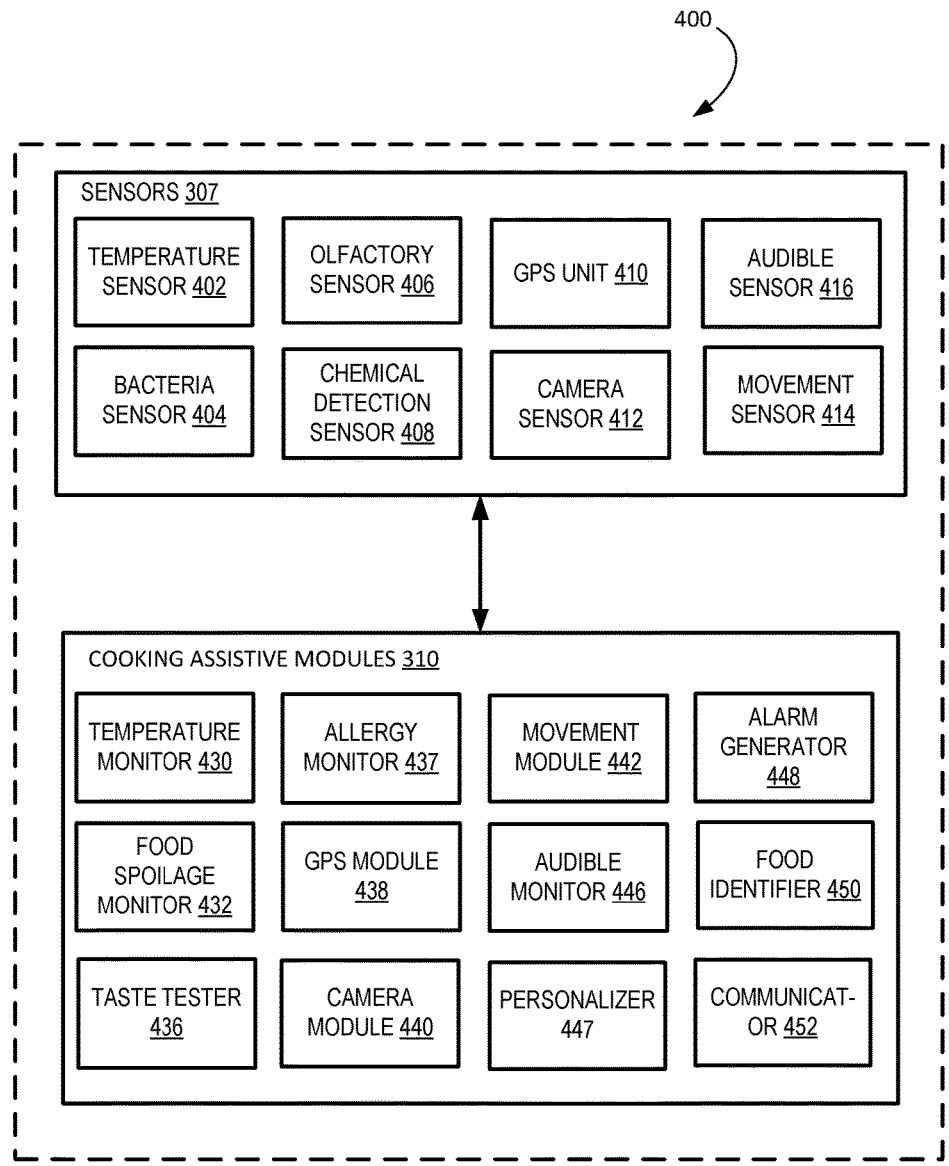
FIG. 4 is a schematic illustrating example sensors and cooking assistive modules of the investigative computer of FIG. 3.

FIG. 4 shows a portion 400 of the investigative computer 300 comprising the sensors 307 and the cooking assistive modules 310. The artisan will understand that the sensors 307 and the cooking assistive modules 310 shown in FIG. 4 are exemplary only and are not intended to be independently limiting.

The sensors 307 may be contact sensors, non-contact sensors, active sensors, passive sensors, or any other sensor whether now known or subsequently developed that can be used to determine at least one characteristic of or associated with a food item. In an embodiment, the compartment 106 may have openings that correspond to the openings 110 in the housing walls, and the sensors 307 housed within (e.g., partially enclosed by) the compartment 106 may sense at least one characteristic of the food item via the openings 110 and the corresponding openings in the compartment 106. In some embodiments, one or more sensors 307 may be embedded within or disposed atop the housing walls (e.g. the top wall 104B or another wall). In embodiments, the investigative computer 300, including one or more sensors 307 associated therewith, may be provided on or embedded within the outer surface(s) of the housing 102 (e.g., on the walls 104A, 104B, 104C, etc.) for surface lab-on-a-chip applications.

In one embodiment, the sensors 307 may comprise a temperature sensor 402, a bacteria sensor 404, an olfactory sensor 406, a chemical detection sensor 408, a GPS unit 410, a camera sensor 412, an audible sensor 416, and a movement determination sensor 414. Each of these sensors 307 may, but need not, be commercially available. The cooking assistive modules 310 of the software 304 may, in an embodiment, include a temperature monitor 430, a food spoilage monitor 432, a taste tester 436, an allergy monitor 437, a GPS module 438, a camera module 440, a movement module 442, an audible monitor 446, a personalizer 447, an alarm generator 448, a food identifier 450, and a communicator 452.

To illustrate the operation of the device 100, an example will now be detailed. Consider that the user 340 intends to prepare a well done burger in his kitchen (or elsewhere). The user 340 may use the input device 112 and/or the mobile computer 342 to select a recipe he or she prefers for the well done burger. The user 340 may view the recipe (e.g., on the output device 114 and/or the mobile computer 342) and, for example, season the meat in accordance therewith. The user 340 may then make a meat patty and place same on a pan or grill as set forth in the recipe. The user 340 may further place the cooking assistive device 100 atop (or otherwise proximate) the meat patty. Once this is done, the user 340 may, if he or she so desires, leave the kitchen (to entertain a guest, watch television, etc.).

The device 100, and specifically the temperature monitor 430 thereof, may employ data obtained from the temperature sensor 402 to monitor the temperature of the patty in line with the requirements of the selected recipe. The temperature sensor 402 may be, for example, a thermal imaging camera or other non-contact sensor or sensor array (e.g., infrared sensor array) that periodically measures the temperature profiles of various portions (e.g., the top side, the center, etc.) of the patty. If a pizza, for example, was being prepared, the thermal imaging sensor may have indicated the current temperature of the crust, the cheese layers, the toppings on the surface and within the cheese layer, et cetera.

Assume that the recipe provides that the patty is to be flipped over after the temperature of the meat patty has been maintained at 150 degrees Fahrenheit for two minutes. Once the internal temperature of the patty reaches 150 degrees Fahrenheit, the cooking assistive module 310, and specifically the communicator 452, may send a message to the user 340 via the mobile computer 342 indicating that the user 340 would need to flip the patty over in about two minutes. Such an early notice may give the user 340 sufficient time to return to the kitchen to flip the patty over as required by the recipe. The communicator 452 may similarly send the user 340 additional messages before the two minutes are up to remind the user 340 that he needs to flip the patty over shortly. If the two minutes are up and the patty still has not been flipped over, the alarm generator 448 may generate an alarm (e.g., an audible alarm, a visual alarm, a combination of both, etc.) to apprise the user 340 that he or she needs to tend to the burger immediately. The user 340 may timely flip the meat patty because of the communications from the communicator 452. The user 340 may further place the device 100 on the other side of the patty, so that the temperature of the patty can continue to be monitored by the temperature monitor 430.

The device 100, and specifically the food spoilage monitor 432 thereof, may employ bacteria sensor(s) 404 to ensure that the patty does not contain an unsuitable level of bacteria. The bacteria sensors 404 may include, for example, CARDs (i.e., chemically actuated resonant devices) augmented with carbon nanotubes, such as the CARDs recently developed by the Massachusetts Institute of Technology chemists, or other sensors configured to ascertain the levels of bacteria in the patty. In embodiments, the bacteria sensor(s) 404 may include, for instance, a fiber-optic biosensor (such as the one developed by the University of Quebec and the Indian Institute of Technology in Kanpur) or another sensor configured to detect the presence of *E. coli*. Alternately or additionally, the bacteria sensor(s) 404 may include a contact or non-contact *salmonella* recognition sensor or system, such as the non-contact *salmonella* recognition device developed by the Auburn University team. The food spoilage monitor 432, upon evaluation of the readings of the bacteria sensors 404, may determine whether the patty is unsuitable for consumption. If so, the alarm generator 448 may generate an alarm and/or the communicator 452 may communicate a warning to the mobile device 342 to apprise the user 340 of same.

In some embodiments, and particularly when the underlying food item (e.g., the meat in this example) is to be cooked per the recipe, the food spoilage monitor 432 may make a preliminary determination of food spoilage before the food item is cooked and make a final determination of food spoilage after the food item has been cooked. Each of the preliminary determination and the final determination may be communicated to the user 452; alternately, the user 340 may be told that the food item is unsuitable for consumption only after the food item has been cooked per the recipe. Evaluating the food item for spoilage after it is cooked may ensure that the food item is not ultimately deemed unsuitable for consumption in error, e.g., in situations where the heat from the cooking process has killed off much of the bacteria. In other embodiments, the communicator 452, upon communicating with the food spoilage monitor 432, may notify the user 340 that the food item may contain excessive bacteria but that it will reevaluate the bacteria levels once the food item has been cooked.

In some embodiments, the food spoilage monitor 432 may further employ data from the olfactory sensors 406 to determine whether a food item is spoiled. The olfactory sensors 406 may include conductive polymer sensors, tin-oxide gas sensors, quartz-crystal micro-balance sensors, and/or other olfactory sensors. The olfactory sensors 406 may measure one or more characteristics of the odor emanating from the meat patty, and the food spoilage monitor 432 may compare same to the databank of meat smells in the food database 332 to determine if the meat is spoiled. If so, the alarm generator 448 and/or the communicator 452 may apprise the user 340 that the meat is unfit for consumption.

The food spoilage monitor 432 may similarly be used to determine if other food items (e.g., food items that were left over on the table from dinner the previous night) are spoiled or can be consumed; for example, the user 340 may situate the device 100 in a bowl containing Teriyaki chicken that was served for dinner last night, and dispose of same where the device 100 indicates that the chicken is spoiled (e.g., has excessive bacteria, smells bad, etc.).

In embodiments, the taste tester 436 may obtain data from the chemical detection sensor 408 to evaluate the taste of the food item (e.g., of the burger patty in this example). The chemical detection sensor 408 may employ spectroscopy, chromatography, nanoparticle detection, or any other chemical detection method now known or subsequently developed to determine the presence (or absence) of a particular chemical in the food item. The chemical detection sensor 408 may, for example, be a refractometer configured to determine the sodium content and/or other chemicals or substances in the burger patty. Where the data from the chemical detection sensor 408 indicates that the food item is not seasoned correctly (e.g., the salt content of the patty is lower than that specified by the recipe), the communicator 452 may communicate a message to the mobile computer 342 instructing the user 340 to address the problem (e.g., the communicator 452 may notify user 340 that a teaspoon (or other appropriate amount) of salt is to be added to the meat). In some embodiments, the device housing 102 may have a dispenser 120 containing salt which may be configured to automatically dispense an appropriate amount of salt on the food item in response to a determination by the taste tester 436 that the food item has an undesirably low sodium content. For example, the dispenser 120 may have an openable door that is automatically opened by the electronics 108 for a time period to allow an appropriate amount of salt to be dispensed on the food item.

The dispenser 120, in embodiments, may comprise a plurality of sections 120A, each of which may be configured to retain a substance useable in cooking the food item (e.g., salt, pepper, chili, sugar, oil, herbs, etc.); in these embodiments, the electronics 108 may selectively open one section 120A for a time period to allow an appropriate amount of a cooking substance to be dispensed on the food item (or, e.g., in the pan in which the food item is being prepared).

In some embodiments, the device 100 may allow the user 340 to identify any substances to which the user 340 is allergic (e.g., sugar, peanuts, etc.), so that the device 100 may ensure that the user selected recipe does not include same and/or includes a suitable substitute thereof (e.g., contains aspartame instead of sugar); where the chemical detection sensor 408 indicates the presence of a substance to which the user 340 is allergic, the allergy monitor 437 may cause the communicator 452 to communicate a warning to the user 340 regarding same via the mobile computer 342.

The artisan understands that geographical location (e.g., altitude) may affect cooking operations (e.g., baking, stove top cooking, etc.). At high altitudes, the air typically has less oxygen and atmospheric pressure, so a cooking operation may take longer at 3,000 feet above sea level as compared to a cooking operation at sea level. Similarly, water may boil at 208 degrees Fahrenheit at 3,000 feet above sea level instead of at 212 degrees Fahrenheit. The device 100 may, in embodiments, take such into account. Specifically, the GPS module 438 may determine the location of the cooking operation via data obtained from the GPS unit 410, and the GPS module 438 may thereafter make appropriate adjustments to the recipe to take the location of the current cooking operation into account. For example, where the burger recipe is for a cooking operation at sea level but the burger is currently being made at a high altitude, the temperature monitor 430 may adjust the temperature and/or time at which the burger patty is to be flipped over to account for the current location of the cooking operation.

The GPS module 438 may also provide other benefits. For example, and as discussed above, the temperature monitor 430, via the communicator 452, may send a message to the user 340 to apprise the user 340 that he or she needs to take some action (e.g., needs to flip over the burger) with respect to the food being prepared. The mobile computer 342, which may be carried by the user 340 on his person, may also include a global positioning module. In embodiments, the device GPS module 438 may compare the location of the device 100 to the location of the mobile computer 342 to determine an approximate distance between the user 340 and the cooking device 100. The communicator 452 may then take this distance into account when sending a message to the user 340 (e.g., a message to a user asking the user to flip over the burger patty at a particular time may be sent one minute before this time where the user is 10 feet away from the device 100 and two minutes before this time where the user is a 100 feet away, to allow the user adequate time to timely reach the device 100/food item being prepared in each case).

In some embodiments, the camera module 440 may employ data from the camera sensor 412 to ensure that the food item looks like it should. The camera sensor 412 may include, for example, a CMOS sensor array, a CCD sensor array, or any other camera sensor now known or subsequently developed, and the camera module 440 may include image processing software and firmware to evaluate the data obtained from the camera sensor 412. The food database 332 may include images of food items (e.g., the database 332 may include an image of a well done burger in this example), and the camera module 440 may compare images of the food item being prepared with the images stored in the database 332. For instance, where the images or other image data obtained from the camera sensor 412 indicates that the burger being prepared is pink as compared to the images of well done burgers in the food database 332, the device 100 may allow the burger to cook for an additional time period before a message is communicated to the user 340 indicating that the burger is ready to consume.

While not required, in some embodiments, and particularly where the food item is being prepared in a closed receptacle (e.g., a pressure cooker, a convection oven, etc.) that is not optically transparent, the device 100 may periodically transmit images of the food item to the user 340 (e.g., to the mobile device 342) so that the user 340 may view the food item being prepared without having to open the receptacle. Such may obviate the need for the user 340 to open the closed receptacle to view the food item (e.g., to review progress of the cooking thereof).

As discussed, in some embodiments, the device 100 may have a propelling mechanism 211 (e.g., wheels 212). In more detail, the device 100 may have movement sensors 414 (e.g., accelerometers, gyroscopes, cameras, GPS, etc.), and the movement module 442 may use data from same, along with the propelling mechanism 211, to cause the device 100 to autonomously move from one location to another. Such may allow the device 100 to determine a characteristic (e.g., temperature, chemical composition, etc.) of the food item at more than one location, for enhanced accuracy and consistency. In some embodiments, the propelling mechanism 211 may comprise electromagnets to allow for electromagnetic coupling between the device 100 and a cooking system; in these embodiments, the device 100 may, for example, rotate about its axis and/or move from one location to another when an electric stove proximate the device 100 is turned on.

In some embodiments, the movement module 442 may use the propelling mechanism 211 and data from the movement sensors 414 to cause the device 100 to stir the food item being prepared. For instance, if the food item being prepared is beef (or another type of) stew, the user 340 may dispose the device 100 in the pan (or other container) in which the stew is being prepared, and the device 100 may autonomously move from one location to another within the pan to effectively stir the stew. Such may allow the user 340 to more conveniently prepare meals that traditionally require much user attention.

Figure 5:
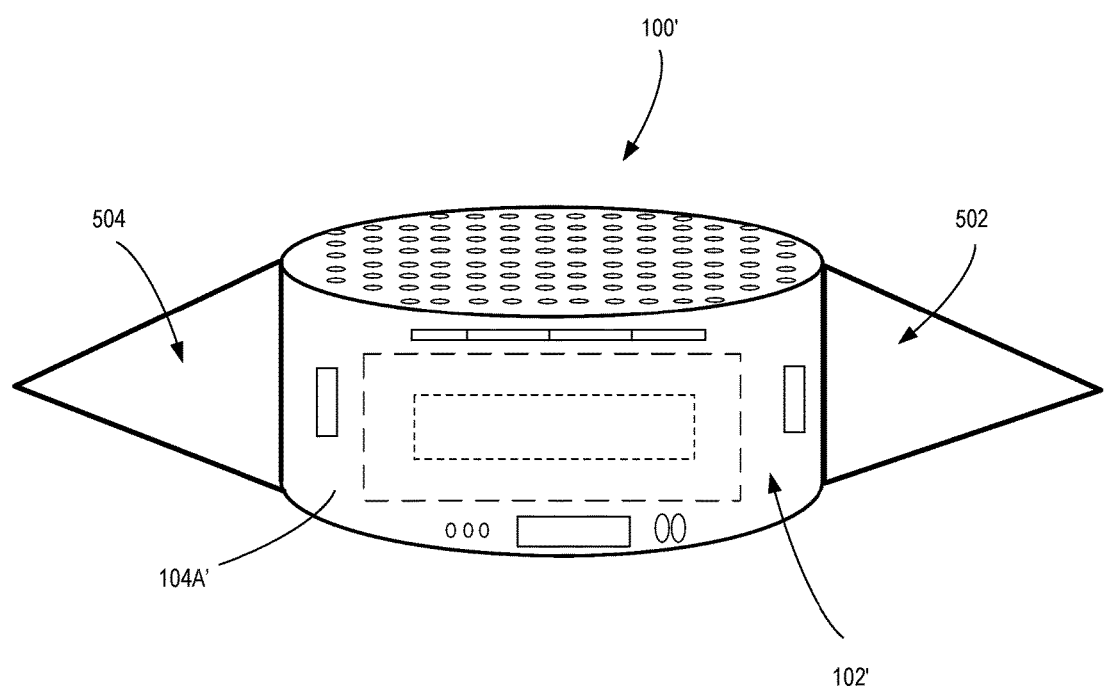
FIG. 5 is a perspective view of an alternate embodiment of the cooking assistive device of FIG. 1.

FIG. 5 shows another embodiment 100' of the cooking assistive device 100. The cooking assistive device 100' is substantially similar to the device 100, except as specifically noted and/or shown, or as would be inherent. Further, those skilled in the art will appreciate that the embodiment 100 (and thus the embodiment 100') may be modified in various ways, such as through incorporating all or part of any of the various described embodiments, for example. For uniformity and brevity, corresponding reference numbers may be used to indicate corresponding parts, though with any noted deviations.

A key difference between the device 100 and device 100' may be that the device 100' may have a housing 102' instead of the housing 102. The housing 102' may, akin to the housing 102 and as shown in FIG. 5, be generally cylindrical; however, the housing 102' may include wings 502 and 504 that extend from the housing side wall 104A' (or another wall). The wings 502 and 504 may allow the device 100' to effectuate a stirring operation more meritoriously as compared to the device 100. In some embodiments, the wings 502 and 504 may be retractable, and may extend out of the housing 102' when the movement module 442 causes the device 100 to stir a food item.

Figure 6:
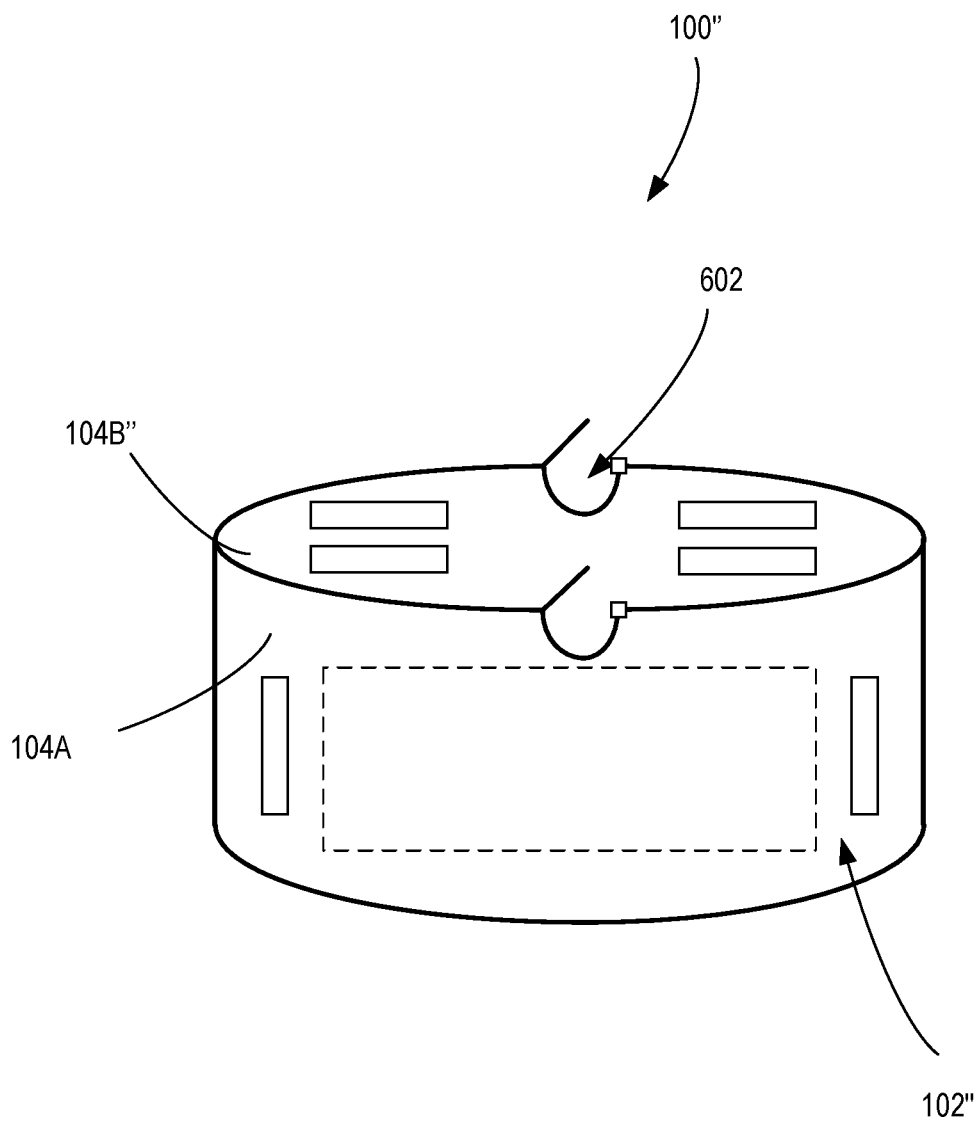
FIG. 6 is a perspective view of another alternate embodiment of the cooking assistive device of FIG. 1.

FIG. 6 shows another embodiment 100" of the cooking assistive device 100. The cooking assistive device 100" is substantially similar to the device 100, except as specifically noted and/or shown, or as would be inherent. Further, those skilled in the art will appreciate that the embodiment 100 (and thus the embodiment 100") may be modified in various ways, such as through incorporating all or part of any of the various described embodiments, for example. For uniformity and brevity, corresponding reference numbers may be used to indicate corresponding parts, though with any noted deviations.

A key difference between the device 100 and device 100' may be that the housing 102" of the device 100" may include hook members 602 on the top wall 104B" (or another wall). The hook members 602 may be openable and closeable and may allow the device 100" to additionally serve as a cooking utensil holder. For example, the user 340 may use the hook members 602 to hold a cooking spoon, stirrer bar, spatula, whisk, etc. Such may be particularly advantageous during a stirring operation, as the cooking utensil may work together with the device 100" to stir a food item more effectively as compared to the device 100. In some embodiments, the cooking assistive device may have retractable wings (as discussed above for FIG. 5, or other such structure) in addition to the hook members 602. Indeed, the housing of the device 100 (or device 100', device 100") may be configured in one of any multitude of ways to allow the device 100 to assist a cooking operation.

In some embodiments, as the device 100" (or 100 or 100') moves through the food item (e.g., a beef or other stew to stir same), it may use data from the movement sensors 414 to evaluate the viscosity (i.e., consistency) of the food item. If the device 100" (or 100 or 100') determines that the consistency of the food item (e.g., stew) is uneven or is otherwise unsuitable, it may, for example, move at increased speed when stirring and/or send a message to the user 340 via the communicator 452 to apprise the user 340 that the food item should be attended to.

Returning now to FIG. 4, the audible monitor 446 may obtain and evaluate data from the audible sensor 416. The audible sensor 416 may be, for example, a microphone or another audible sensor that senses sounds associated with the food item being prepared. In some embodiments, the audible monitor 446 may contain filters and other means to filter out extraneous audible signals (e.g., sounds from the television, radio, etc.) so that the sounds associated with the food item being prepared can be more accurately processed. The communicator 452 may communicate a message to the user 340 where the audible monitor 446 indicates, for example, that the food item is in need of attention (e.g., the burger is sizzling loudly, the beef stew is boiling, etc.).

In some embodiments, the device 100 may be useable by more than one user (e.g., by the user 340 and his or her spouse). The plurality of users using the device 100 may have different preferences (e.g., one user may prefer well done burgers and another user may prefer rare burgers). The personalizer 447 may allow each user of the device 100 to input into the device 100 his or her respective preferences, so that the operation of the device 100 can be controlled in accordance therewith. In embodiments, the two or more users may use the input device 112 (e.g., a fingerprint scanner, an iris scanner, etc.) to identify themselves to the device 100. Alternately, where a user operates the device 100 via his or her mobile computer (e.g., mobile computer 342), the device 100 may automatically configure its operation in line with the preferences of the user with whom the mobile computer 342 is associated. In this way, a solitary device 100 may be used, e.g., by each member of a household, to prepare food in line with his or her individualized preferences.

In some embodiments, the food identifier 450 may use data from one or more sensors (e.g., olfactory sensor 406, chemical detection sensor 408, camera sensor 412, etc.) to identify a food item. For example, where the user 340 places the device 100 atop a meat patty, the device 100 may automatically determine that it is disposed atop a meat patty, which is being used to prepare a burger. The device 100 may then, in embodiments, automatically access the recipe previously identified by the user 340 as his preferred recipe to cook a burger, and tailor its operation to ensure that the burger is prepared in line with this recipe. Such functionality may further streamline the cooking operation, as at least some of the information to be entered by the user 340 to cook the food item (e.g., the type of food, the favorite recipe, etc.) may be automatically determined when the user 340 puts the device 100 in contact with or otherwise proximate the food item.

Once the cooking operation is complete, the user 340 may be allowed to rate the recipe and/or the performance of the device 100 (e.g., a rating of between one and five stars) based on one or more criteria. For example, the user 340 may give the recipe a high rating where the prepared food item is to the liking of the user 340. Similarly, the user 340 may give a high rating to the device 100 where the assistance provided by the device 100 with respect to the particular food item being prepared was valuable (e.g., where the device 100 appreciably cut down the effort that the user 340 would have otherwise had to expend to prepare the food item). Users of devices 100 may, in embodiments, be allowed to select those recipes that have obtained high ratings from other users of other devices 100.

In an embodiment, the device 100 may be used by the user 340 at a restaurant to conveniently convey his or her preferences to restaurant personnel. Assume, for example, that the user 340 is allergic to onions and likes his burger well done. In the prior art, if the user 340 visits a restaurant and orders a burger, he or she would have to specify that the burger is to be well done and that the burger cannot contain any onions. In accordance with the disclosure herein, the user 340 may save such preferences in the device 100, and provide the device 100 to restaurant personnel upon visiting the restaurant. The restaurant may download these (and any other) preferences of the user 340 (e.g., via a computing device at the restaurant). If the user 340 orders a burger, the restaurant may appreciate that the burger is to be well done and cannot contain onions even where the user 340 does not specify same upon ordering. In some embodiments, the device 100 may also allow a user 340 to store his favorite dish at a particular restaurant; the user 340 may then provide the device 100 to restaurant personnel whenever he visits the restaurant, and the restaurant may prepare the dish preferred by the user 340 without the user 340 even having to place an order.

The device 100 may, in embodiments, be powered using a lithium-ion (or other) battery, which may be rechargeable. Additionally or alternately, the device 100 may be powered using a conventional 110V/220V outlet. Further, in some embodiments, the device 100 may be inductively powered. While not required, the device 100 may also, in embodiments, harvest heat energy from the cooking operation and use same for powering the device components; for instance, the device 100 may, in an embodiment, employ the Stirling engine philosophy to convert heat into mechanical energy for a stirring operation.

As noted above, the device 100 may, in embodiments, be configured to dissipate heat. In some embodiments, however, the device 100 may include a heating element to allow the device 100 to temporarily heat up and/or maintain the temperature of a food item. For example, if a food item is being taken from one location to another (e.g., where a plate of casserole is being transported from the user's home to a party), the device 100 may be situated atop or proximate the food item to ensure that the food item remains warm as it arrives at its destination. In some embodiment, the device 100 may harvest energy (e.g., heat energy from the stove on which the food item is being prepared) and subsequently employ this stored energy to heat up and/or maintain the temperature of a food item via the heating element. In some embodiments, the housing 102 itself may comprise materials that allow the device 100 to retain heat (e.g., from a stove, a convection oven, etc.) so that this heat can subsequently be transferred to a food item.

In some embodiments, the cooking assistive device 100 may be configured to provide a stimulus to the food item to influence the flavor profile and/or color thereof (e.g., by effecting a chemical change therein). The stimulus may be, for example, an electrical stimulus, a heat stimulus, etc. For instance, in embodiments, the device 100 may include an electromagnet that communicates electrical energy at various frequencies to the food item to selectively ionize one or more constituents of the food item. Alternately or additionally, the device 100 may include a heating element (e.g., a nichrome, ceramic, or other heating element), which may provide a heat stimulus to the food item and effect a physical and/or chemical change in the food item. Such functionality may allow the device 100 to ensure that a food item (e.g., a burger) prepared one day looks and tastes the same (or generally the same) as a food item (e.g., another burger) prepared on a different day.

The cooking assistive device 100 may, in embodiments, be in data communication with a cooking device (e.g., a stove, microwave, etc.) and be configured to dynamically provide feedback thereto. For example, where the temperature monitor 430 indicates that the temperature of a food item placed on the stove is too low, the cooking assistive device 100 may automatically alter the stove setting so that additional heat is transferred to the food item. Similarly, where the sensors 307 indicate that the food item being prepared is too hot and/or is burning, the device 100 may cause the stove (or another cooking device) to power off. The communication path between the device 100 and the cooking device may be wired or wireless (e.g., Bluetooth, Wi-Fi, etc.). In embodiments, the device 100 may act as a node in a smart home and wirelessly communicate with the one or more smart devices in the smart home. For instance, in embodiments, the cooking assistive device 100 may wirelessly communicate with and control the operation of a smart microwave, a smart oven, etc.

In some embodiments, the cooking assistive device 100 may be utilized as a remote sensory data acquisition and data logging device that can be temporarily or permanently attached to packaged food or refrigerated items during storage and/or transportation of the food items. In embodiments, the device 100 may be adhered to a package or container with a thermally conductive adhesive pad (e.g. Aavid Thermalsil III-AC adhesive thermal pads). The device 100 may track temperature, moisture, gases, bacteria, etc., on or within the food items contained with the storage container. In an example embodiment, a plurality of devices 100, each having associated therewith a preassigned and uniquely configured Media Access Control (MAC) address, may be located in a vehicle transporting various food items. The user may access a particular device 100 via a wireless network (RFID, Bluetooth, WiFi, Zigbee, etc.) on command, and in embodiments, data from the devices 100 may be periodically pushed to the food database 332 or another database in the Cloud. The devices 100 may provide for composite and discrete trending data tracking and allow for transmission of data analytic alert beacons to a Data Server. Each device 100 may also include visual status indicators, displayed e.g., on a display of the device 100, that indicate information regarding food safety, freshness, minimum/maximum temperature experienced, etc. by the food item or food item package associated with the device 100.

Figure 7:
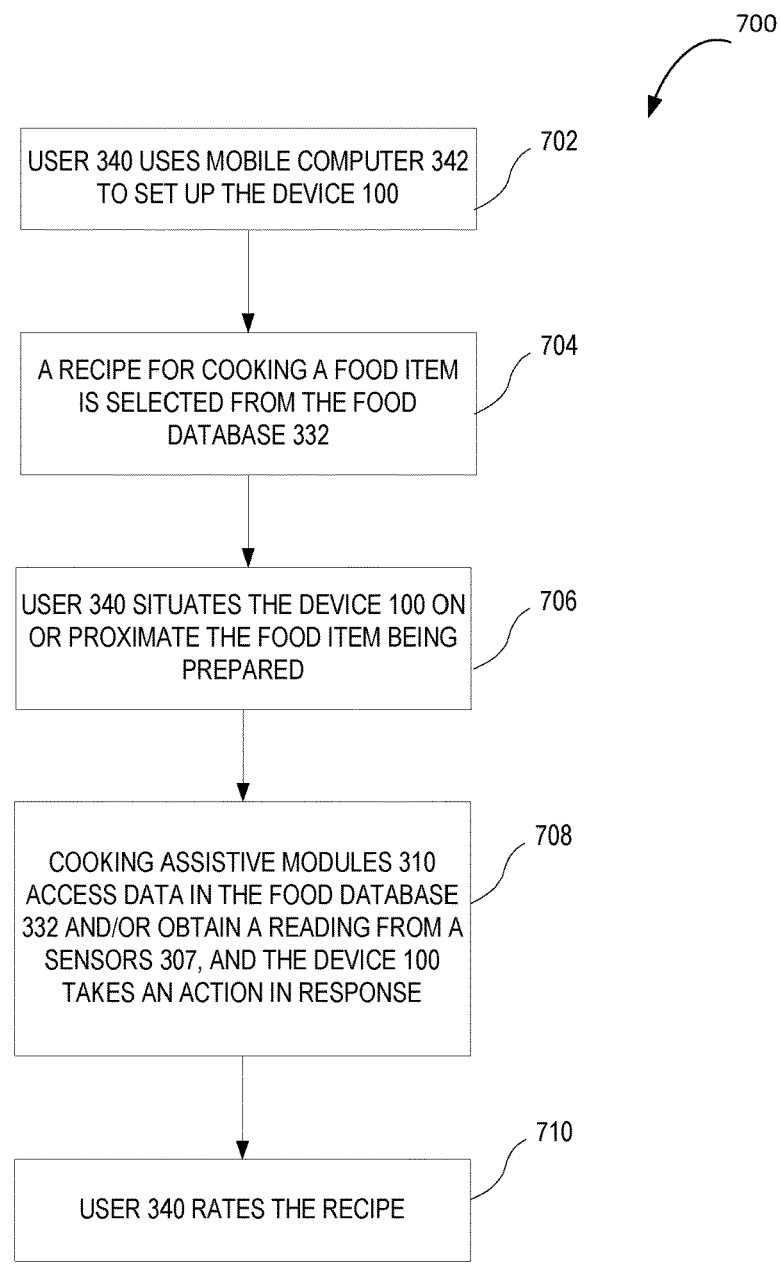
FIG. 7 is a flowchart illustrating an example method of using the cooking assistive device of FIG. 1.

FIG. 7 illustrates an example method 700 of using the device 100 to assist in a cooking operation. At step 702, the user 340 may use the mobile computer 342 to set up the device 100. For example, the user 340 may use the mobile application 346 (or another software implemented on another computing device in communication with the device 100) to set up a user profile, which, as discussed above, may, among other things, indicate the various recipes preferred by the user 340.

At step 704, when the user wishes to prepare a food item, the user may use the mobile computer 342 and/or the input and output devices 112, 114 to select from the database 332 his or her preferred recipe for preparing that food item.

At step 706, the user 340 may situate the device 100 on or proximate (e.g., within five feet) the food item being prepared. For example, the user 340 may situate the device 100 atop a burger patty on a grill, inside a pan in which stew or soup is being prepared, etc.

At step 708, the device 100 (e.g., the cooking assistive modules 310 thereof) may access data in the database 332 and/or obtain a reading from a sensor 307, and take an action in response ("a responsive action"). For example, the device 100 may determine the amount of salt in the food item, and based upon a determination that the selected recipe calls for additional salt in the food item, automatically dispense same via the dispenser 120. Or, for instance, the device 100 may determine that the food item (e.g., a burger patty) needs to be flipped over, and communicate a message regarding same to the user 340 via the mobile device 342. Of course, at step 708, the device 100 may determine any other characteristic of or associated with the food item and provide a controlled response, as discussed herein. At step 710, once the food item is prepared, the device 100 may allow the user 340 to rate the recipe (and, in some embodiments, also the performance of the device 100 during the cooking operation).

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The disclosure claimed is:

1. A cooking assistive device, comprising:
a portable housing configured to be disposed on a food item;
a plurality of sensors situated within said housing; at least one of said plurality of sensors including a camera;
a network interface;
a propelling mechanism comprising wheels;
a memory storing computer-readable instructions; and
a processor configured to execute said instructions to:
(1) access data stored in a remote database;
(2) obtain a reading from at least one of said plurality of sensors;
(3) communicate a message to a mobile device of a user in response to said reading; and
(4) enable said device to autonomously move from one location to another via said wheels.

2. The cooking assistive device of claim 1, further comprising a compartment inside said portable housing.

3. The cooking assistive device of claim 2, wherein said memory and said processor are stored within said compartment.

4. The cooking assistive device of claim 1, further comprising a food identifier to identify said food item.

5. The cooking assistive device of claim 1, further comprising a utensil holder.

6. The cooking assistive device of claim 4, further comprising a dispenser configured to store and dispense a cooking substance.

7. The cooking assistive device of claim 1, wherein said plurality of sensors includes each of a bacteria sensor, an olfactory sensor, and an audible sensor.

8. The cooking assistive device of claim 1, wherein said portable housing is generally in the shape of a hockey puck.

9. The cooking assistive device of claim 1, wherein said plurality of sensors includes a temperature sensor.

10. The cooking assistive device of claim 1, wherein at least one of said plurality of sensors is a non-contact sensor.

11. The cooking assistive device of claim 1, further comprising a global positioning unit.

12. The cooking assistive device of claim 1, wherein said message instructs said user to take an action within a time period.

13. The cooking assistive device of claim 12, wherein said processor is further configured to execute said instructions to generate an alarm in response to a determination that said user failed to take said action within said time period.

14. The cooking assistive device of claim 1, wherein at least one of said plurality of sensors is a bacteria sensor.

15. The cooking assistive device of claim 1, further comprising a food spoilage monitor.

16. The cooking assistive device of claim 15, wherein:
   at least one of said plurality of sensors is an olfactory sensor; and
   said food spoilage monitor is configured to generate an alarm where data from said olfactory sensor indicates that said food item is unfit for consumption.

17. A cooking assistive device, comprising:
   a portable housing configured to be disposed on a food item;
   a plurality of sensors situated within said housing;
   a network interface;
   a food identifier to identify said food item;
   a dispenser configured to store and dispense a cooking substance;
   a memory storing computer-readable instructions; and
   a processor configured to execute said instructions to:
      (1) access data stored in a remote database;
      (2) obtain a reading from at least one of said plurality of sensors; and
      (3) communicate a message to a mobile device of a user in response to said reading.

18. The cooking assistive device of claim 17, further comprising a propelling mechanism.

19. The cooking assistive device of claim 18, wherein said propelling mechanism comprises wheels.

20. The cooking assistive device of claim 17, further comprising a utensil holder.

\* \* \* \* \*